Nov. 19, 1929.   E. G. K. ANDERSON   1,736,145
FASTENING FOR THREADLESS PIPES
Filed April 20, 1928
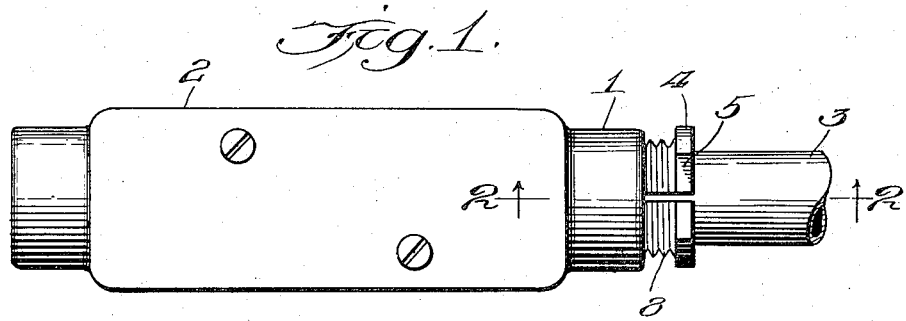
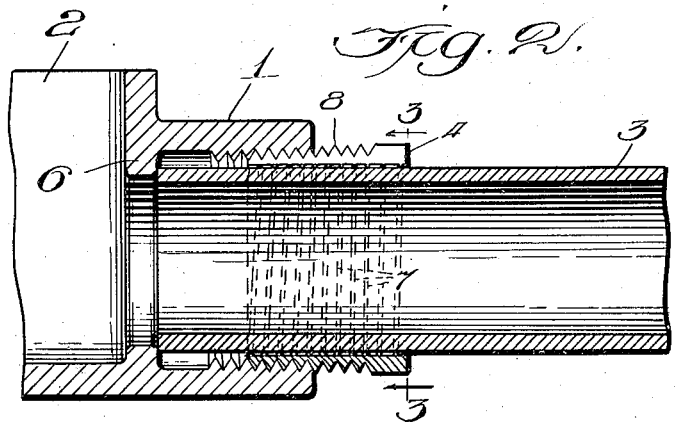
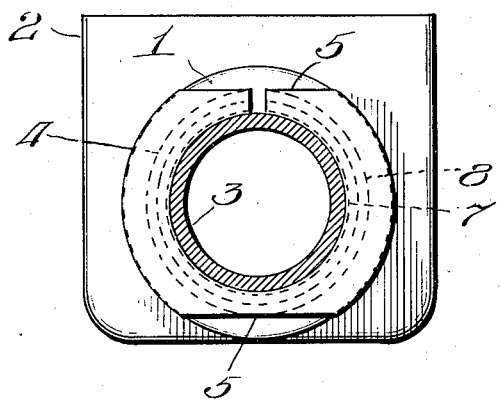
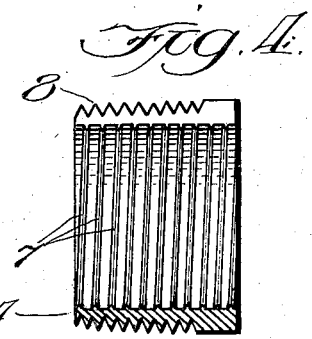
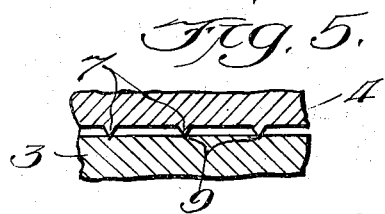
Inventor:
E. G. K. Anderson,
by Wm. F. Freudenreich,
Atty.

Patented Nov. 19, 1929

1,736,145

UNITED STATES PATENT OFFICE

ERNST G. K. ANDERSON, OF EVANSTON, ILLINOIS, ASSIGNOR TO APPLETON ELECTRIC COMPANY, A CORPORATION OF ILLINOIS

FASTENING FOR THREADLESS PIPES

Application filed April 20, 1928. Serial No. 271,457.

The present invention has for its object to produce a simple and novel means for positively securing a threadless pipe to a connection box or the like.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is an elevation of a connection box having a threadless pipe secured thereto in accordance with my invention; Fig. 2 is a section, on an enlarged scale, on line 2—2 of Fig. 1; Fig. 3 is a section taken on line 3—3 of Fig. 2; Fig. 4 is a section of the coupling sleeve on the same plane as that of Fig. 2; and Fig. 5 is a section on the same plane as Fig. 2, on a greatly enlarged scale, showing fragments of the pipe and coupling sleeve.

Referring to the drawing, 1 represents a tubular boss projecting from a connection box 2 or the like and internally screwthreaded. 3 is a threadless pipe smaller in diameter than the interior diameter of the boss. In order to secure the pipe and box together, I employ a split sleeve 4 slightly tapered and screwthreaded on the outside. One end of the sleeve is flattened, as indicated at 5, or otherwise shaped to permit the sleeve to be turned by means of a wrench or the like.

It will thus be seen that when the pipe is inserted in the boss, with its inner end resting against the wall 6 of the connection box, with the sleeve surrounding the pipe; upon screwing the sleeve into the boss it is contracted about and grips the pipe. Since the grip of the sleeve on the pipe is a frictional one, only, the pipe may perhaps not be held securely enough to prevent accidental withdrawal thereof. In accordance with my invention, I place a shallow spiral cutting edge 7 in the interior of the sleeve, the pitch of the spiral being the same as that of the thread 8 on the exterior of the sleeve.

Therefore, when the sleeve is screwed in it acts as a die, cutting or pressing lightly into the surface of the pipe to form a shallow spiral valley, as indicated at 9 in Fig. 5. Consequently the pipe will be interlocked with the sleeve which in turn is interlocked with the boss on the box, and the pipe and the box cannot accidentally be separated by a mere pull on the pipe.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:—

1. In combination, an internally screwthreaded member, a threadless pipe extending into said member, and a tapered split sleeve surrounding said pipe and adapted to be screwed into said members, said sleeve having on the interior means to bite into the pipe along a spiral of the same pitch as the screwthreads on the sleeve.

2. In combination, an internally screwthreaded member, a threadless pipe extending into said member, and a tapered split sleeve surrounding said pipe and adapted to be screwed into said members, said sleeve having an internal shallow sharp rib forming a spiral of the same pitch as the screwthreads on the sleeve.

In testimony whereof, I sign this specification.

ERNST G. K. ANDERSON.